United States Patent [19]
Rimedio et al.

[11] Patent Number: 5,382,294
[45] Date of Patent: Jan. 17, 1995

[54] CHROMATOGRAPHIC SEPARATION OF ORGANIC NON-SUGARS, COLLOIDAL MATTERIALS AND INORGANIC-ORGANIC COMPLEXES FROM JUICES, LIQUORS, SYRUPS AND/OR MOLASSES

[76] Inventors: Nicholas T. Rimedio, 2017 Ashley Rd., Savannah, Ga. 31410; Li Fu Chen, 112 Seneca La., West Lafayette, Ind. 47906

[21] Appl. No.: 98,237

[22] Filed: Jul. 29, 1993

Related U.S. Application Data

[63] Continuation of Ser. No. 749,667, Aug. 26, 1991, abandoned.

[51] Int. Cl.$^6$ .............................. C13J 1/06; C13D 3/14; B01D 15/08
[52] U.S. Cl. .................................. 127/42; 127/55; 127/56; 127/46.3; 210/635; 210/656; 210/198.2; 210/659
[58] Field of Search ......................... 127/55, 56, 42, 61, 127/46.3; 210/687, 635, 656, 659, 198.2

[56] References Cited

U.S. PATENT DOCUMENTS

| | | | |
|---|---|---|---|
| 2,413,844 | 1/1947 | Rawlings | 127/55 |
| 2,482,765 | 9/1949 | Haagensen | 127/55 |
| 3,340,093 | 9/1967 | Cortis-Jones et al. | 127/56 |
| 4,104,078 | 8/1978 | Barker et al. | 127/46.2 |
| 4,257,884 | 3/1981 | Lim | 210/656 |
| 4,325,743 | 4/1982 | Tibbetts et al. | 127/46.2 |
| 4,363,672 | 12/1982 | Kulprathipanja | 127/46.3 |
| 4,379,751 | 4/1983 | Yoritomi et al. | 127/46.2 |
| 4,406,590 | 9/1977 | Riffer | 127/55 |
| 4,502,890 | 3/1985 | Urbanic | 127/46.2 |
| 4,717,425 | 1/1988 | Lefebvre | 127/55 |
| 4,746,368 | 5/1988 | Frank et al. | 127/46.3 |
| 5,176,832 | 1/1993 | Dorta et al. | 127/46.3 |

Primary Examiner—Paul Lieberman
Assistant Examiner—Patricia L. Hailey
Attorney, Agent, or Firm—Cushman Darby & Cushman

[57] ABSTRACT

The object of the present invention is to chromatographically separate the higher and lower molecular weight components of juices, liquors, syrups and/or molasses (e.g., inorganic-organic complexes and organic non-sugars), thereby permitting the lower molecular weight sugar and soluble salt-containing fraction(s) to be further processed into natural sweetener products.

27 Claims, 17 Drawing Sheets

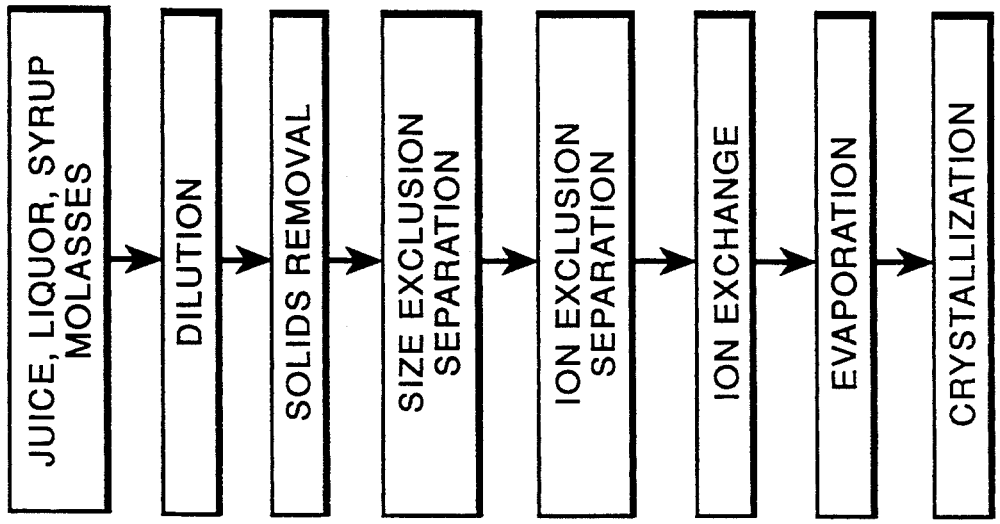
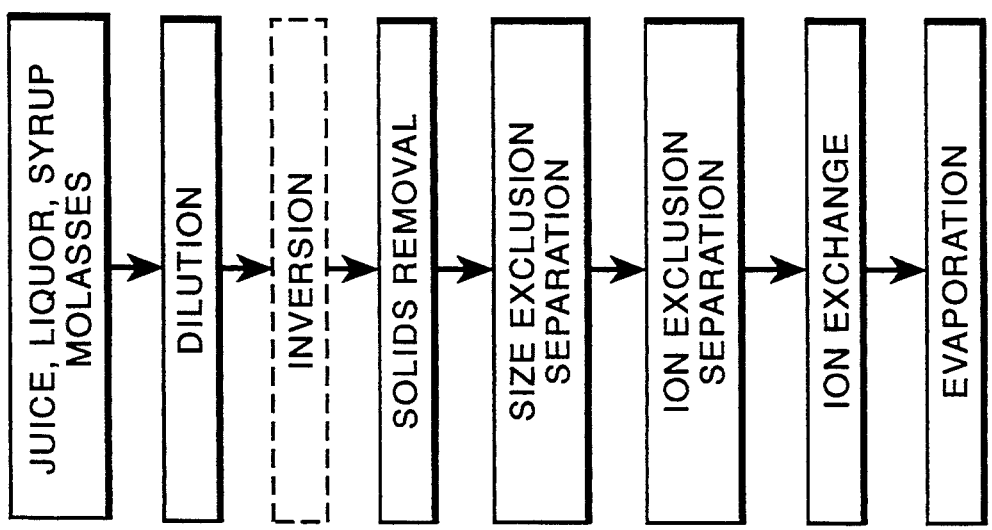

CHROMATOGRAPHIC SEPARATION OF ORGANIC NON-SUGARS, COLLOIDAL MATTERIALS AND INORGANIC-ORGANIC COMPLEXES FROM JUICES, LIQUORS, SYRUPS AND/OR MOLASSES

This is a continuation of application Ser. No. 07/749,667, filed on Aug. 26, 1991, which was abandoned upon the filing hereof.

FIELD OF INVENTION

This invention relates to a process for chromatographically separating organic non-sugars, colloid materials and inorganic-organic complexes from juices, liquors, syrups and/or molasses thereby permitting further purification of the sugars from these solutions into finished sweetener products. More particularly, the invention relates to a process for separating the higher molecular weight components of juices, liquors, syrups and/or molasses from the lower molecular weight components including, inter alia, sugars, by chromatographic separation. According to this invention, separation of the higher molecular weight components from the lower molecular weight components, permits the sugars in the lower molecular weight fraction to be further processed into natural sweetener products for use in the food, pharmaceutical, dairy, and bottling industries.

BACKGROUND OF INVENTION

Juices, liquors, syrups, and/or molasses comprise a class of sugar-containing solutions which are produced during raw sugar manufacturing and sugar refining. Juice refers to the liquid part of a plant or fruit which is extracted for sugar recovery. Syrup is the term generally applied to liquid sugar solutions made by boiling or evaporating mixtures containing sugar and water, such as raw sugar juice or clarified raw sugar juice. The term liquor generally refers to partially concentrated sugar solutions and syrups generated during the raw sugar manufacturing and sugar refining processes.

Molasses is a dark brown sugar-containing composition which is generated during raw sugar manufacturing and sugar refining. The mixture of sugar and mother liquor discharged from the sugar boiling pan is called massecuite. In raw sugar practice the different grades of massecuites are given either letter (A, B, C) or number ($1^{st}$, $2^{nd}$ $3^{rd}$) designation. The mother liquor or molasses purged from the massecuites are given similar designations, (i.e., A massecuite yields A molasses). Refinery massecuites are usually named strikes and the mother liquor is refereed to as a syrup. Blackstrap or final molasses is the by- or end-product of raw sugar manufacturing and sugar refining. It is a viscous liquid which is separated from the final low grade massecuite. The sucrose present in blackstrap molasses cannot be crystallized therefrom by conventional methods.

A generalized analytical listing of the composition of juices, liquors, syrups, and/or molasses cannot be made because of the many variations in starting materials and manufacturing processes used to obtain or prepare these compositions. These variations include variety and maturity of starting material e.g., sugar cane, beet, etc., climate, soil condition, extent of milling, and clarification technique.

The primary components of interest to the present invention are always existent in juices, liquors, syrups, and/or molasses, and comprise the lower molecular weight components of these solutions which include sugars (sucrose, glucose, and fructose) and inorganic salts ("ash"). A secondary group of interest comprises the higher molecular weight components of juices, liquors, syrups, and/or molasses, and these include the organic non-sugars, nitrogenous compounds, non-nitrogenous acids, waxes, sterols, phosphatides, gums, starches, pentosans and vitamins. Various inorganic-organic complexes are present in this high molecular weight grouping as well. These high molecular weight components are usually present only in small amounts, such as a few percent by weight.

Process juices, liquors, syrups and/or molasses are a group of sucrose containing solutions that are produced during the various steps of raw sugar manufacturing and sugar refining. The higher molecular weight components present in these solutions tend to retard sucrose crystallization. Removal of the high molecular weight components is very desireable because it permits a higher recovery of sucrose from crystallization of the process solutions.

The sucrose present in blackstrap or final molasses is not recoverable by conventional techniques, although several processes for such recovery have been suggested. These are generally referred to as "de-sugarization" processes, and the most attractive of them requires pre-treatment of the molasses followed by ion exclusion chromatography to separate the sucrose from the non-sucrose impurities.

One such de-sugarization process is used in the processing of beet molasses. In this process beet molasses is pre-treated to reduce the calcium ion concentration therein, then processed by ion exclusion chromatography to separate the sucrose from the non-sucrose components. The resulting sugar-rich fraction is evaporated and the sucrose crystallized therefrom.

A major drawback to the proposed desugarization processes, particularly when applied to de-sugarize molasses derived from cane sugar processing, results from fouling of the ion exclusion resin due to blockage of the resin pores by the higher molecular molasses components. This fouling results in the need for frequent regeneration or replacement of the chromatographic resins, a requirement which significantly increases processing costs to an unacceptable level.

It is known in U.S. Pat. No. 4,104,078, hereby incorporated by reference, in toto, to separate dextrans in carrier solvents (70–95% solvent) by a chromatographic method involving a sequential valve operation. Other U.S. Patents of interest involving chromatographic or related separations are U.S. Pat. Nos. 4,257,884, 4,717,425, 4,379,751 and 4,363,672, all hereby incorporated by reference.

Accordingly, it is an object of the present invention to provide an effective method for separating the lower molecular weight sugars from the higher molecular weight non-sugar impurities of juices, liquors, syrups and, particularly, molasses, which process may be economically employed on a commercial scale to achieve increased recovery of sugar. This is achieved by increasing sugar recovery from the feed of juices, liquors, syrups, molasses or mixtures of them by removal of the higher molecular weight non-sugar impurities which in turn permits further processing of the lower molecular weight fraction by ion exclusion chromatography, ion exchange chromatography and/or crystallization to produce a natural sweetener product for use in the food, pharmaceutical, dairy and bottling industries.

SUMMARY OF INVENTION

The invention generally comprises a process wherein juices, liquors, syrups, and/or molasses are separated into two fractions consisting of (1) a lower molecular weight component fraction comprising sugar and ash; and (2) a higher molecular weight component fraction containing non-sugar impurities which comprise organic non-sugars, nitrogenous compounds, non-nitrogenous acids, waxes, sterols, phosphatides, gums, starches, pentosans, vitamins, and various inorganic-organic complexes.

Separation of the juices, liquors, syrups, and/or molasses into their lower and higher molecular weight components permits the lower molecular weight sugar-containing fraction of these solutions to be processed to achieve a higher degree of sugar extraction. For example, the separation of blackstrap or final molasses into its lower and higher molecular weight components allows for further processing of the lower molecular weight fraction to produce a sweetener suitable for use in the food, pharmaceutical, dairy and bottling industry. In addition, the separation of process juices, liquors syrups, and/or molasses into their lower and higher molecular weight components achieves an increase in the amount of sucrose crystallized from the lower molecular weight fraction, or optionally, further processing of the lower molecular weight fraction directly to produce a sweetener suitable for use in the food, pharmaceutical, dairy and bottling industry.

According to the present process, the relatively low molecular weight components of juices, liquors, syrups, and/or molasses (e.g., sugars and soluble salts) are separated from the higher molecular weight components such as organic non-sugars, nitrogenous compounds, non-nitrogenous acids, waxes, sterols, phosphatides, gums, starches, pentosans, vitamins, and various inorganic-organic complexes, by chromatographic separation. Separation may be achieved, for instance, using a size exclusion resin having a controlled pore size. Suitable size exclusion resins include, but are not limited to: particles or bead of porous cellulose, crosslinked agarose (Sepharose), crosslinked dextran (Sephadex), styrene-divinylbenzene (Dianon HP-20), polyacrylamide (Bio Gel), methacrylic (Toyopearl), and controlled pore glass.

As disclosed herein, the lower molecular weight sugar components in juices, liquors, syrups, and/or molasses may be effectively separated from the higher molecular weight components to achieve increased sugar recovery by crystallization and/or purification, by passing the juice, liquor, syrup, and/or molasses through a size exclusion medium which is packed in a suitable separating apparatus such as a column. As the juice, liquor, syrup, and/or molasses passes through the porous medium, the higher molecular weight components are unable to diffuse through the pores in the resin, therefore they pass directly through the medium more quickly than the lower molecular weight components which pass through the resin pores. Thus, the higher molecular weight components exit the medium more quickly than the lower molecular weight components.

More specifically this invention is a process for separating inorganic-organic complexes, colloidal materials and organic non-sugars from juices, liquors, syrups, molasses or mixtures thereof into two or more fractions, at least a first fraction comprising the higher molecular weight non-sugar components, and at least a second fraction comprising the lower molecular weight sugar and soluble salt components, by means of a chromatographic separation medium. The process comprises steps of a) diluting a feed of juice, liquor, syrup, molasses or mixtures thereof with water sufficient to permit passage of the sample through a chromatographic separation medium, b) removing insoluble matter from feed, and c) passing the diluted feed through the chromatographic separation medium and eluting the feed components from the medium with water, thereby achieving separation of the higher and lower molecular weight components of the feed into two or more fractions, at least the first fraction comprising the higher molecular weight non-sugar components, and at least the second fraction comprising the lower molecular weight sugar and soluble salt components. It is preferred that the lower molecular weight fraction is then evaporated to about 45°-80° brix. The sucrose contained in the lower molecular weight fraction can be crystallized. Also, the sugars in the lower molecular weight fraction can be separated from the soluble salt components by ion exclusion chromatography and optionally the resulting lower weight molecular fraction is then evaporated to about 45°-80° brix. It is also preferred that the sucrose contained in that lower molecular weight fraction be crystallized. Also, the sugars in the lower molecular weight fraction can be further purified by ion exclusion and/or ion exchange chromatography and optionally evaporated to about 45°-80° brix. Sucrose can also be crystallized. Sucrose contained in the original lower molecular fraction can be inverted to glucose and fructose and optionally further purified by ion exchange chromatography. That lower molecular fraction is also preferably evaporated to about 45°-80° brix. This purification by ion exclusion and/or ion exchange chromatography and evaporation cycle can be repeated one or more times.

Even more specifically this invention is a process for separating inorganic-organic complexes, colloid materials and organic non-sugars from process juices, liquors, syrups, molasses or mixtures thereof into two or more fractions, at least the first fraction comprising the higher molecular weight non-sugar components, and at least the second fraction comprising the lower molecular weight sugar and soluble salt components, by means of a chromatographic separation medium. The process comprises of a) diluting a feed of juice, liquor, syrup, molasses or mixtures thereof with water sufficient to permit passage of the feed through the separation medium, b) reducing the metal cations in the feed by precipitation, c) inverting the sucrose in the feed to fructose and dextrose, d) removing the insoluble matter from the feed, e) adjusting the pH of the feed to a range of between about 2.5 and 7, f) removing soluble matter from the pH adjusted feed, g) passing the feed through the chromatographic separation medium using water as an eluant, thereby achieving separation of the higher and lower molecular weight components of feed into two or more fractions, at least the first fraction comprising the higher molecular weight non-sugar components, and at least the second fraction comprising molecular weight sugar and soluble salt components, h) reducing the divalent cation concentration in the fractions to a range between about 0 and 5,000 parts based on solids per million, i) evaporating the lower molecular weight component containing fractions to a range of about 35°–80° brix, and j) reducing the non-sugar concentration to a range of about 0–20% based on solids, so that lower molecular weight component containing fractions can be further processed into an edible sweetener product.

The cations in step b) are generally substantially divalent cations, usually substantially calcium. The insoluble matter can be removed by centrifugation or filtration in steps d), f) or both. Also the insoluble matter can be removed by both centrifugation and filtration in steps d), f) or both. The preferred pH in step e) is between about 3 and 6. The non-sugar concentration in step j) is preferably reduced by ion exclusion and/or ion exchange chromatography and optionally the lower molecular weight fraction is then evaporated to about 45°–80° brix. The process of concentration being reduced by ion exclusion and/or ion exchange chromatography followed by evaporation can be repeated at least once.

BRIEF DESCRIPTION OF THE DRAWINGS

FIGS. 13 to 20 are schematic block diagrams showing the various alternative processes of this invention.

DETAILED DESCRIPTION OF INVENTION

Reference will now be made in detail to the preferred embodiment of the present invention.

To improve the recovery of sugar from process juices, liquors, syrups, and/or molasses, we found it advantageous to separate the lower molecular weight sugar and ash components of the process solutions from the higher molecular weight non-sugar impurities contained therein including organic non-sugars, nitrogenous compounds, non-nitrogenous acids, waxes, sterols, phosphatides, gums, starches, pentosans, vitamins, and various inorganic-organic complexes.

To achieve separation of the lower and higher molecular weight components from juices, liquors syrups and/or molasses we disclose a process having several embodiments:

EXAMPLE 1

Molasses was pre-treated by dilution with water to about 50° brix and acidified to approximately pH 2.2 with 66 Be' sulfuric acid. This solution was then heated to approximately 70° C. and allowed to react for four hours. During this time, the sucrose portion of the sample inverted to the monosaccharides glucose and fructose, and the calcium level in the sample was reduced by precipitation as calcium sulphate. After inversion and precipitation, the sample was centrifuged to remove the calcium sulphate precipitate and any other suspended solids, and the liquid phase was decanted and saved.

Following inversion, sodium hydroxide was added to the decanted sample to raise the pH to approximately 5.0, and the resulting solution was stirred for about 15 minutes. The sample was then filtered to remove any remaining insoluble solids.

Figure 1:
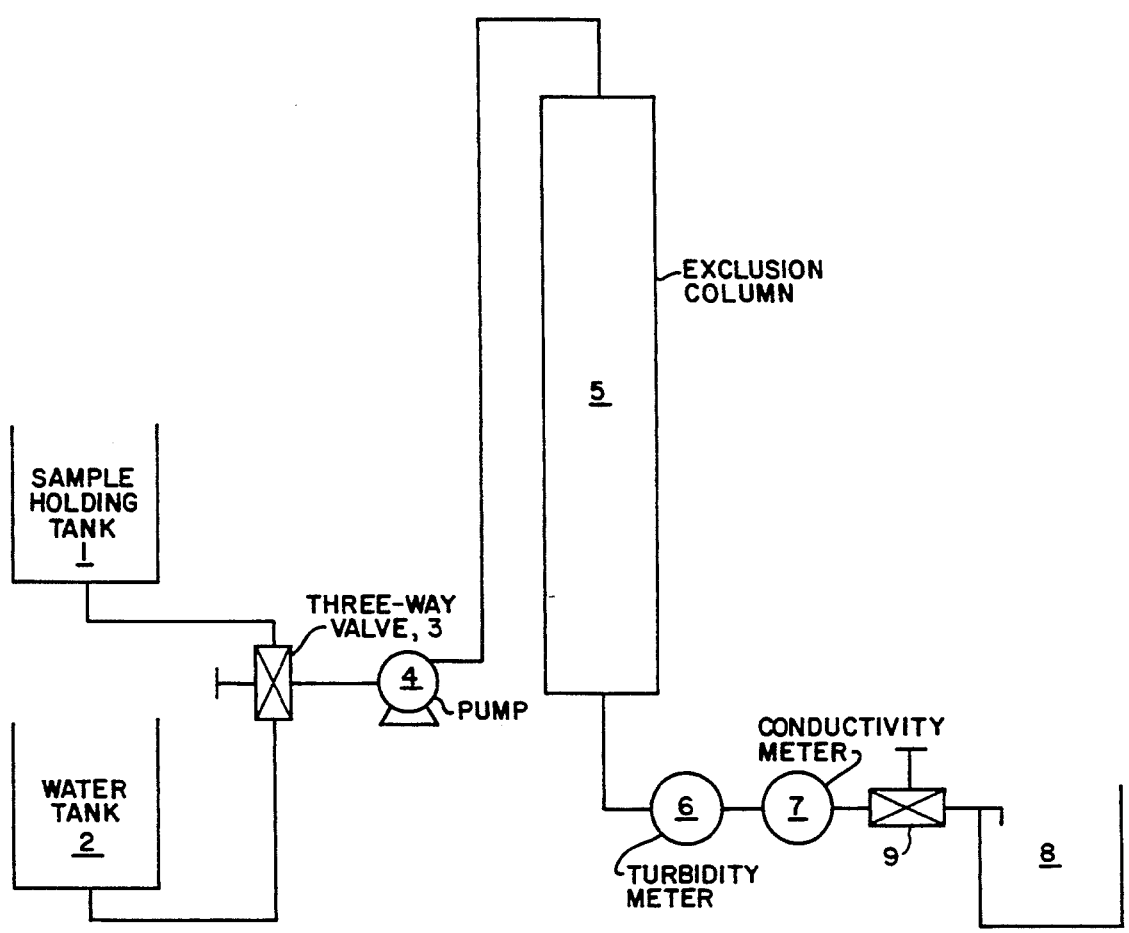
FIG. 1 is a diagram of an apparatus suitable for use in the present invention as shown in examples 1–6.

Using an apparatus such as that described in FIG. 1, i.e., a cylindrical column 5 centimeters in diameter and 90 centimeters long packed with porous cellulose beads to a depth of 90 centimeters, the lower molecular weight sugar and ash components of the pre-treated molasses were separated from the higher molecular weight non-sugar impurities.

Specifically, 551 ml of pretreated molasses at a brix of approximately 45° was pumped by the pump 4 from a sample holding tank 1 through a three-way valve 3, to and through a porous cellulose bead size exclusion column 5 at a flow rate of about 175 ml/minute. The sample was then eluted with water pumped from a water tank 2, and the eluate was monitored for turbidity and conductivity using a turbidity meter 6 and a conductivity meter 7. Finally, eluate flows through valve 9 to product eluate holding tank 8.

Figure 2:
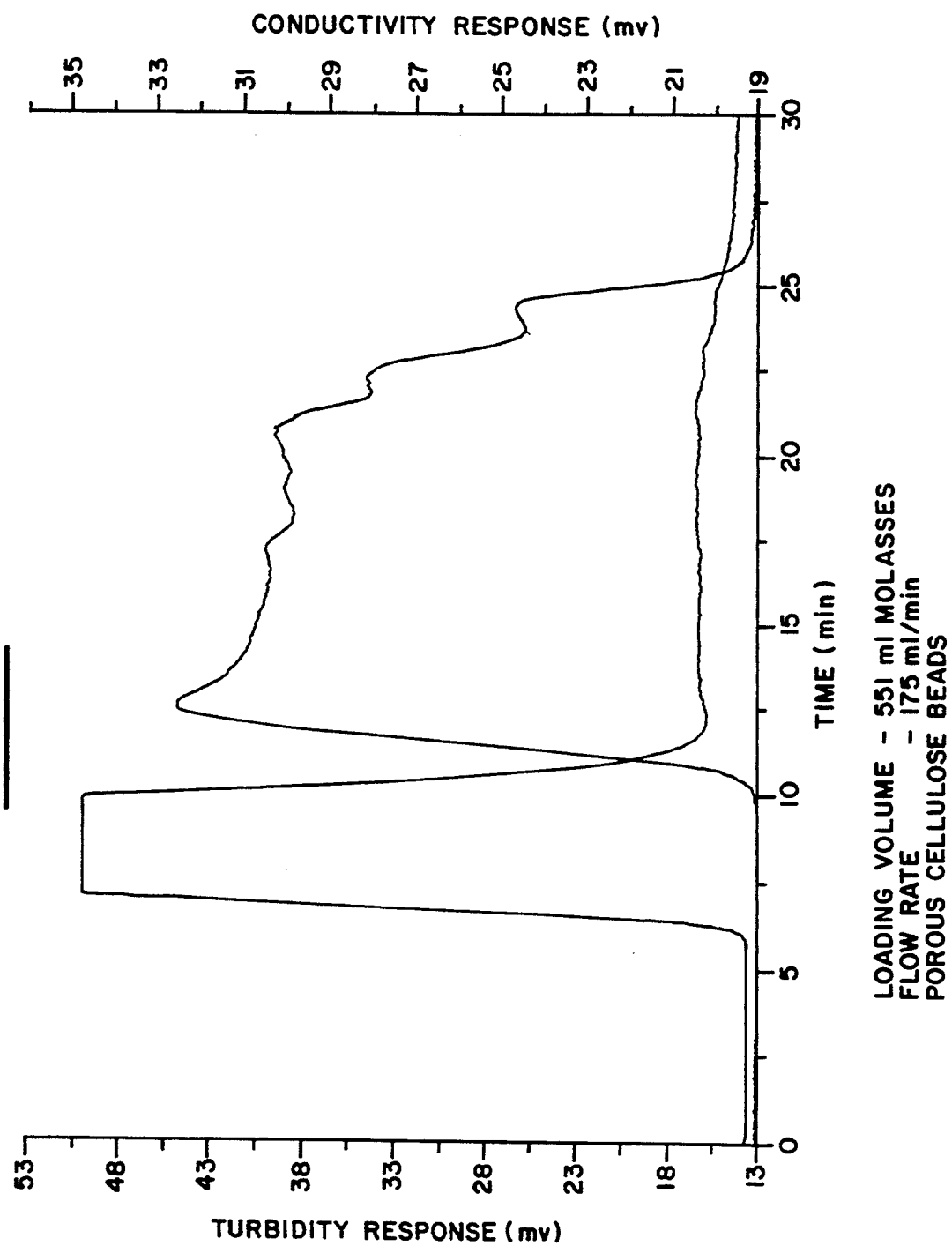
FIGS. 2–7 graphically represent the mode of change of concentration distribution of feed as it exits the separating medium of examples 1–6. The abscissa represents the volume of effluent exiting the column with the ordinate on each side representing conductivity, and turbidity, as shown.

As shown in FIG. 2, turbidity and conductivity values correspond to changes in the concentration of the higher molecular weight components—higher turbidity values represent high concentrations of high molecular components, and conductivity measurements reflect the change in concentration of the low molecular weight sugars and salts.

As evidenced by the turbidity readings, the first fraction to exit the column contained the higher molecular weight non-sugar impurities. In this example and the examples to follow, the first fraction was discarded, however, when run on an industrial scale, one part of this fraction would be discarded as waste, while a second part would be recycled to be used as dilution water in step a) of subsequent processes. The second fraction to exit the column contained the lower molecular weight sugars and salts as evidenced by the conductivity readings. This fraction was collected in the product tank 8.

FIG. 2 shows a graphical representation of the change in concentration distribution of the pretreated molasses as it exits the column; the abscissa represents time, the ordinate represents turbidity and conductivity, as shown.

EXAMPLE 2

Figure 3:
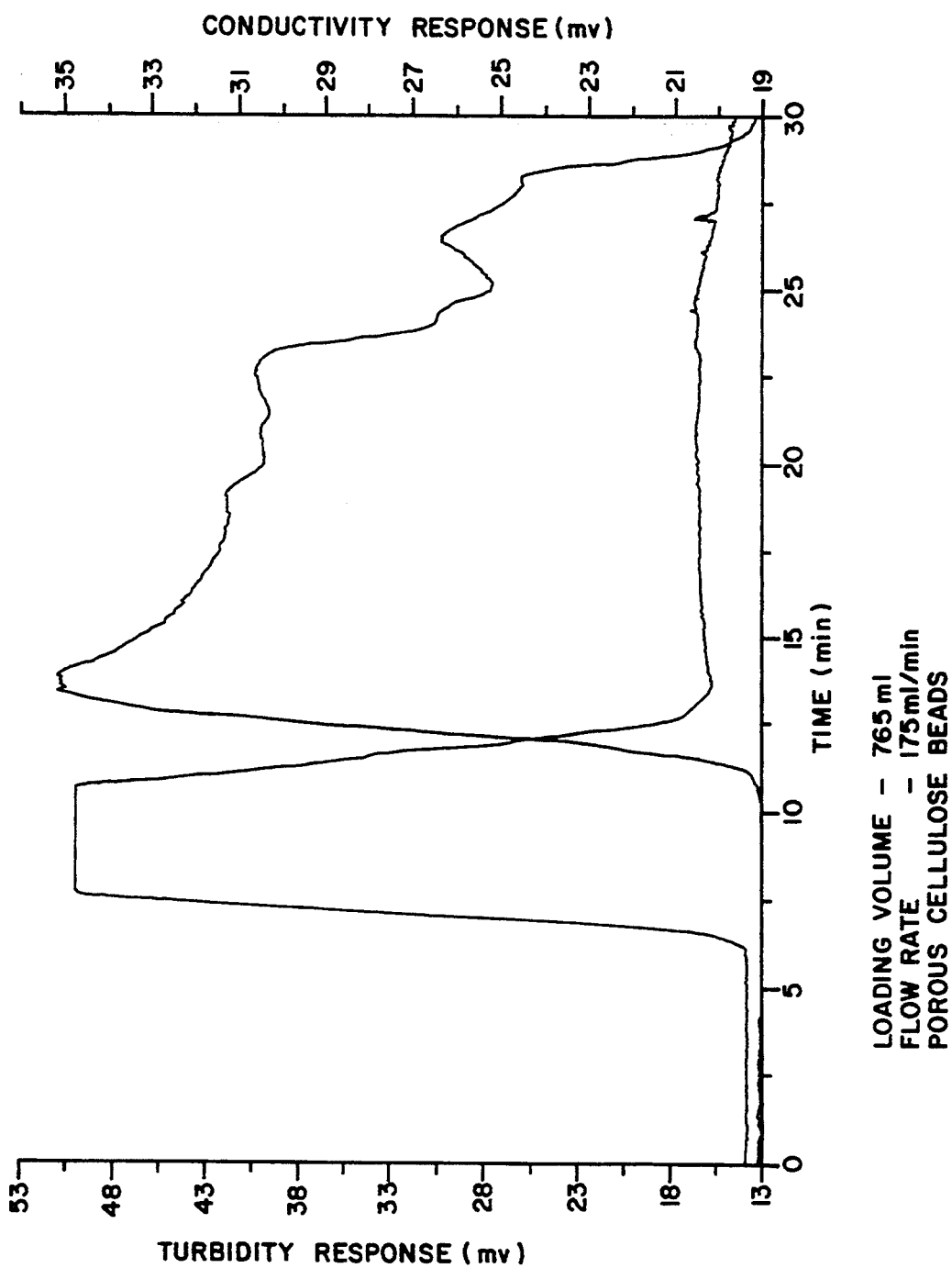

Employing the process described in Example 1, except that 765 ml of pretreated molasses were loaded onto a porous cellulose bead size exclusion column and the components eluted therefrom. As shown in FIG. 3, using the same graphical representation as in FIG. 2.

EXAMPLE 3

Figure 4:
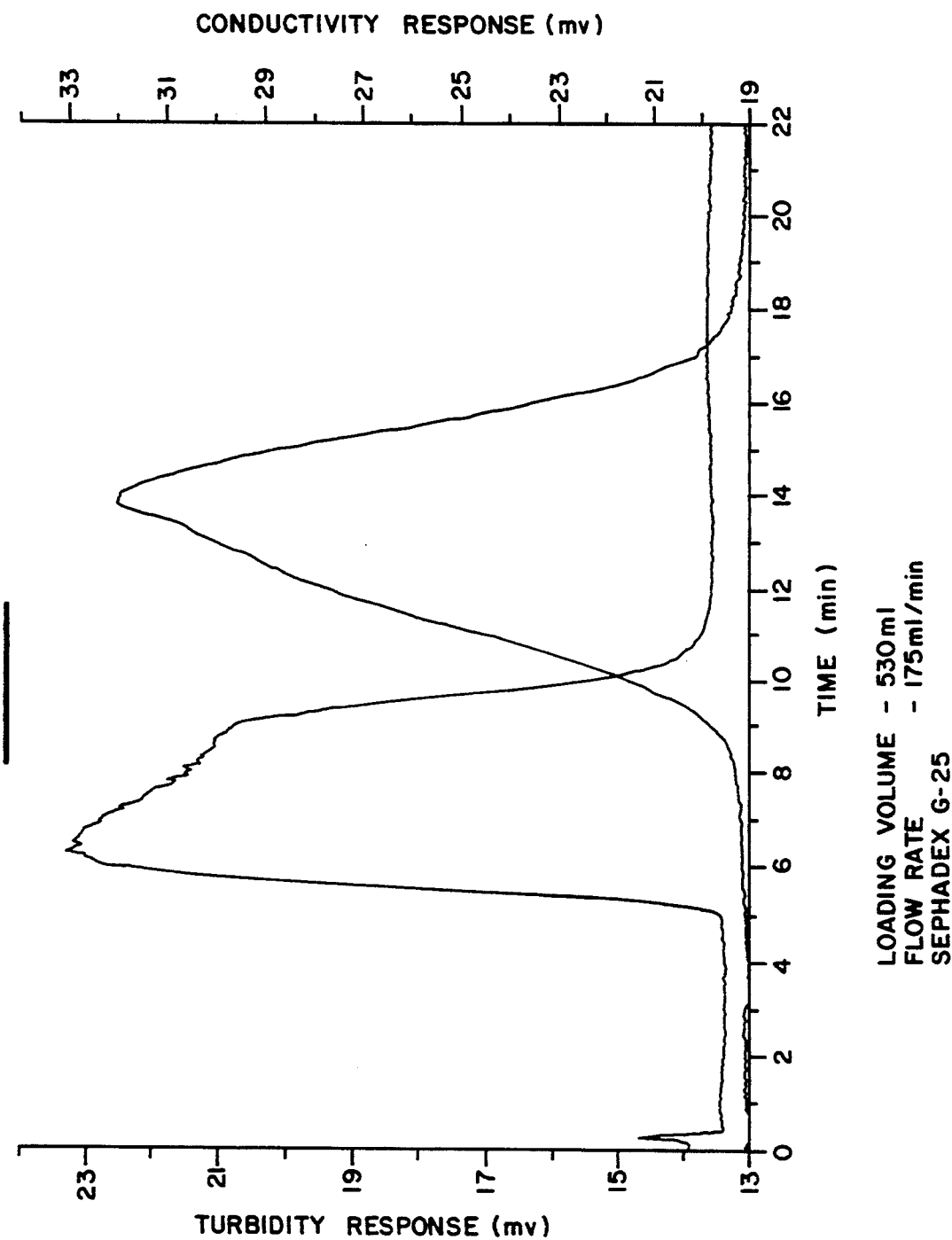

Employing the process described in Example 1, except that 530 ml of pretreated molasses were loaded onto a porous dextran size exclusion column and the components eluted therefrom. As shown in FIG. 4, using the same graphical representation as in FIG. 2.

EXAMPLE 4

Figure 5:
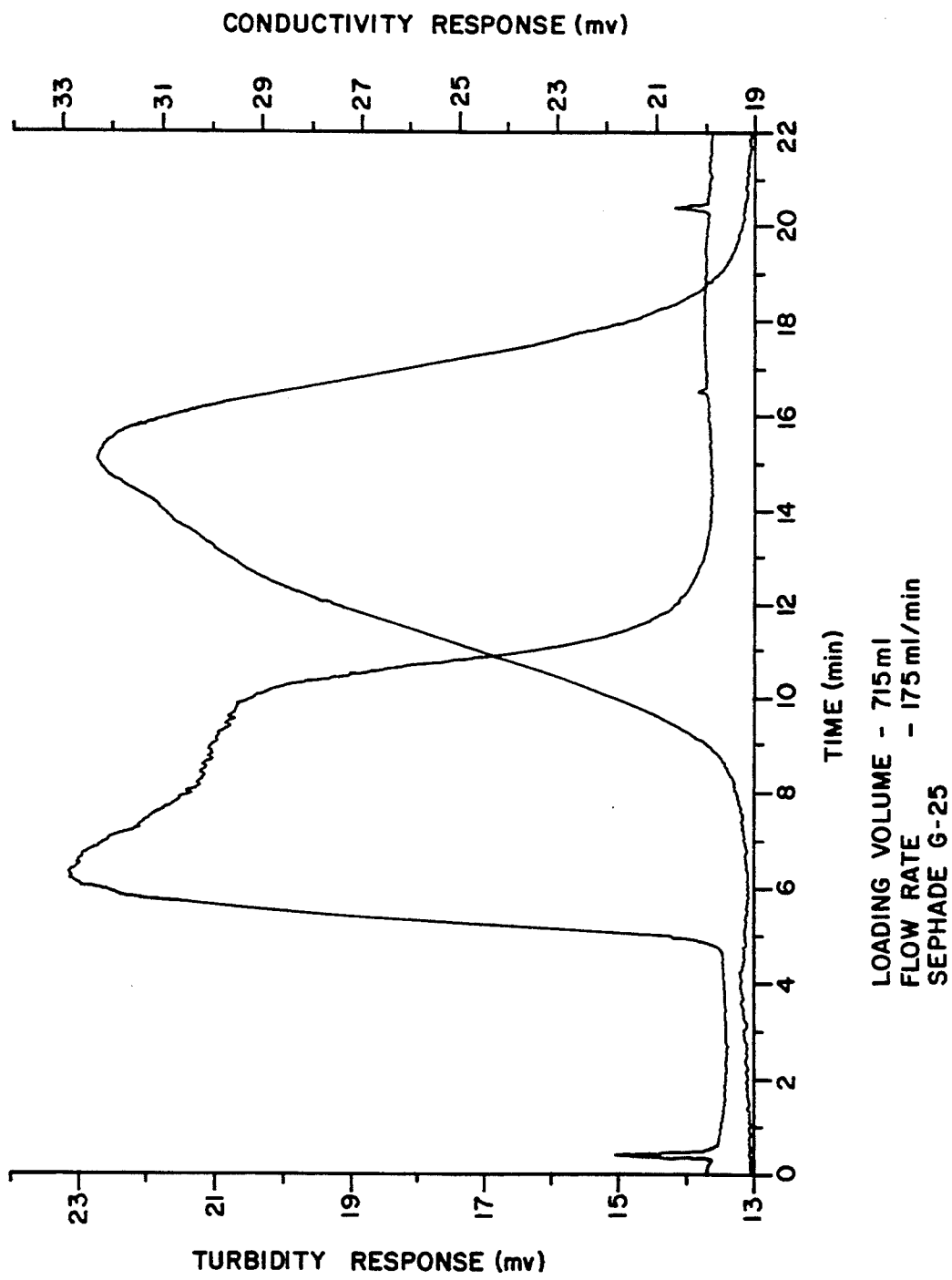

Employing the process described in Example 1, except that 715 ml of pretreated molasses were loaded onto a porous dextran size exclusion column and the components eluted therefrom. As shown in FIG. 5, using the same graphical representation as in FIG. 2.

EXAMPLE 5

Figure 6:
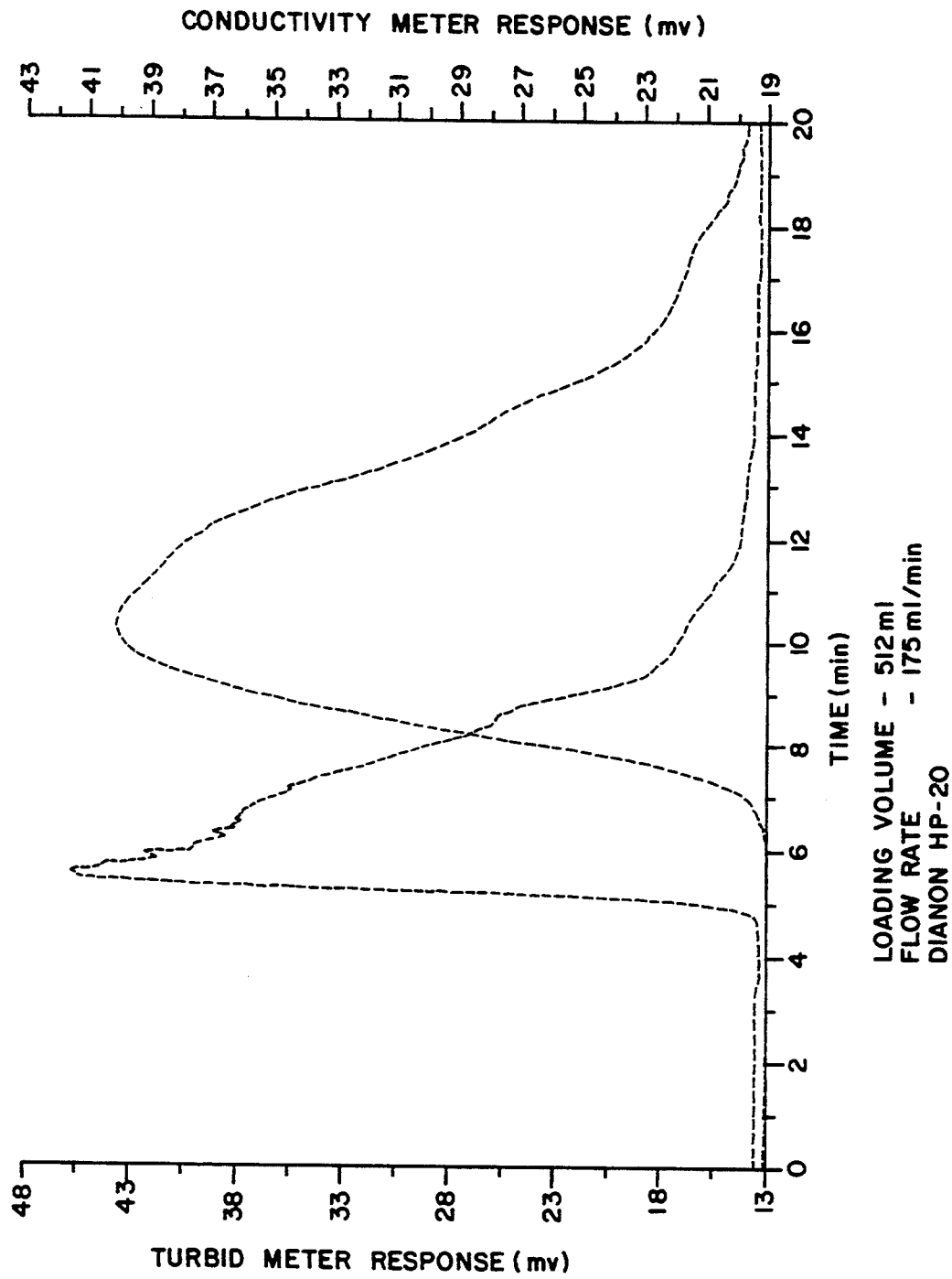

Employing the process described in Example 1, except that 512 ml of pretreated molasses were loaded onto an H-P bead size exclusion column and the components eluted therefrom. As shown in FIG. 6, using the same graphical representation as in FIG. 2.

EXAMPLE 6

Figure 7:
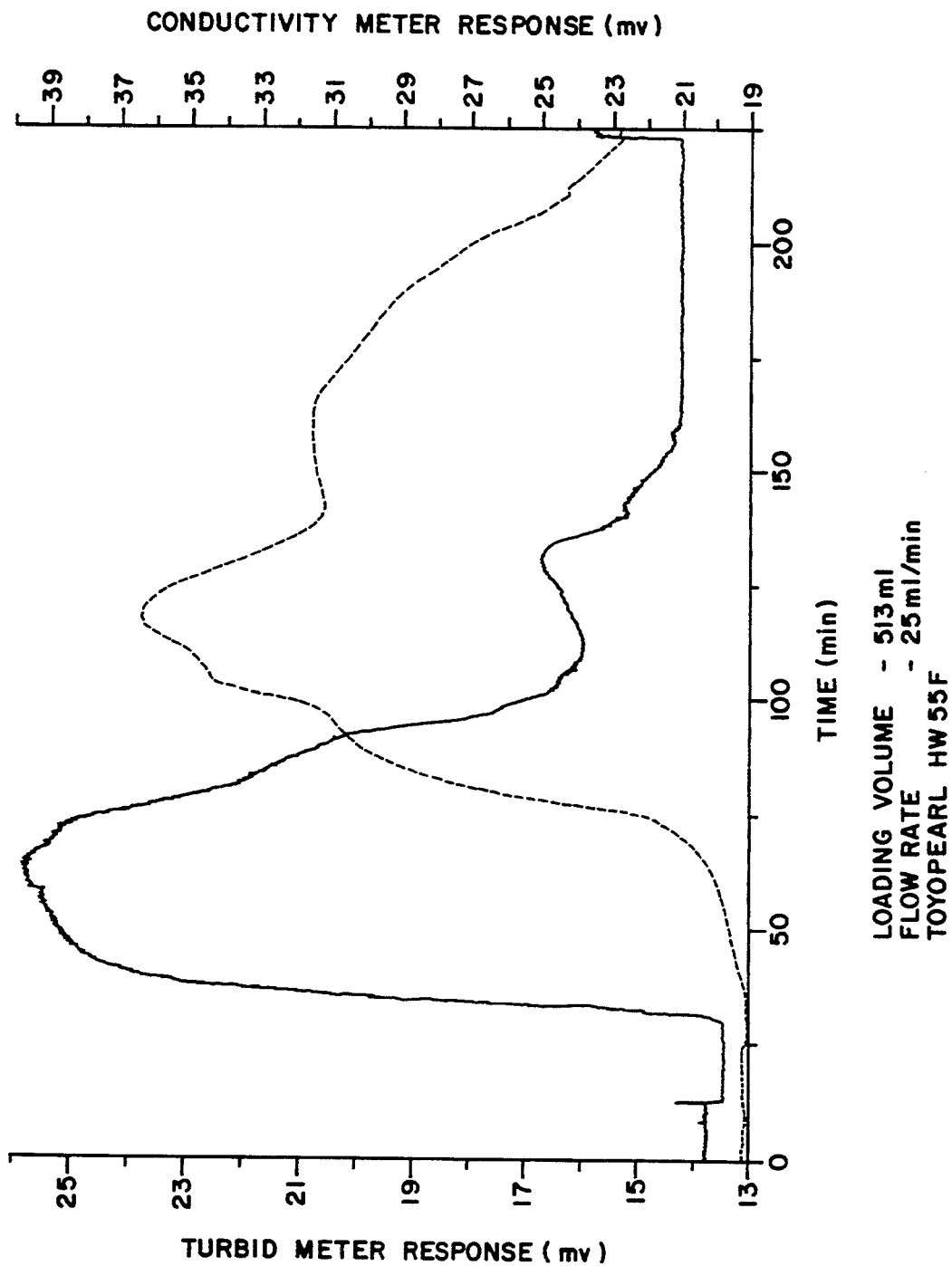

Employing the process described in Example 1, except that 513 ml of pretreated molasses were loaded onto a Toyopearl size exclusion column and the components eluted therefrom with water fed to the column at a flow rate of approximately 25 ml/minute. As shown in FIG. 7, using the same graphical representation as in FIG. 2.

EXAMPLE 7

Molasses was diluted to approximately 45° brix with water and centrifuged to remove the suspended solids therefrom. The liquid syrup eluate was decanted and saved.

Figure 8:
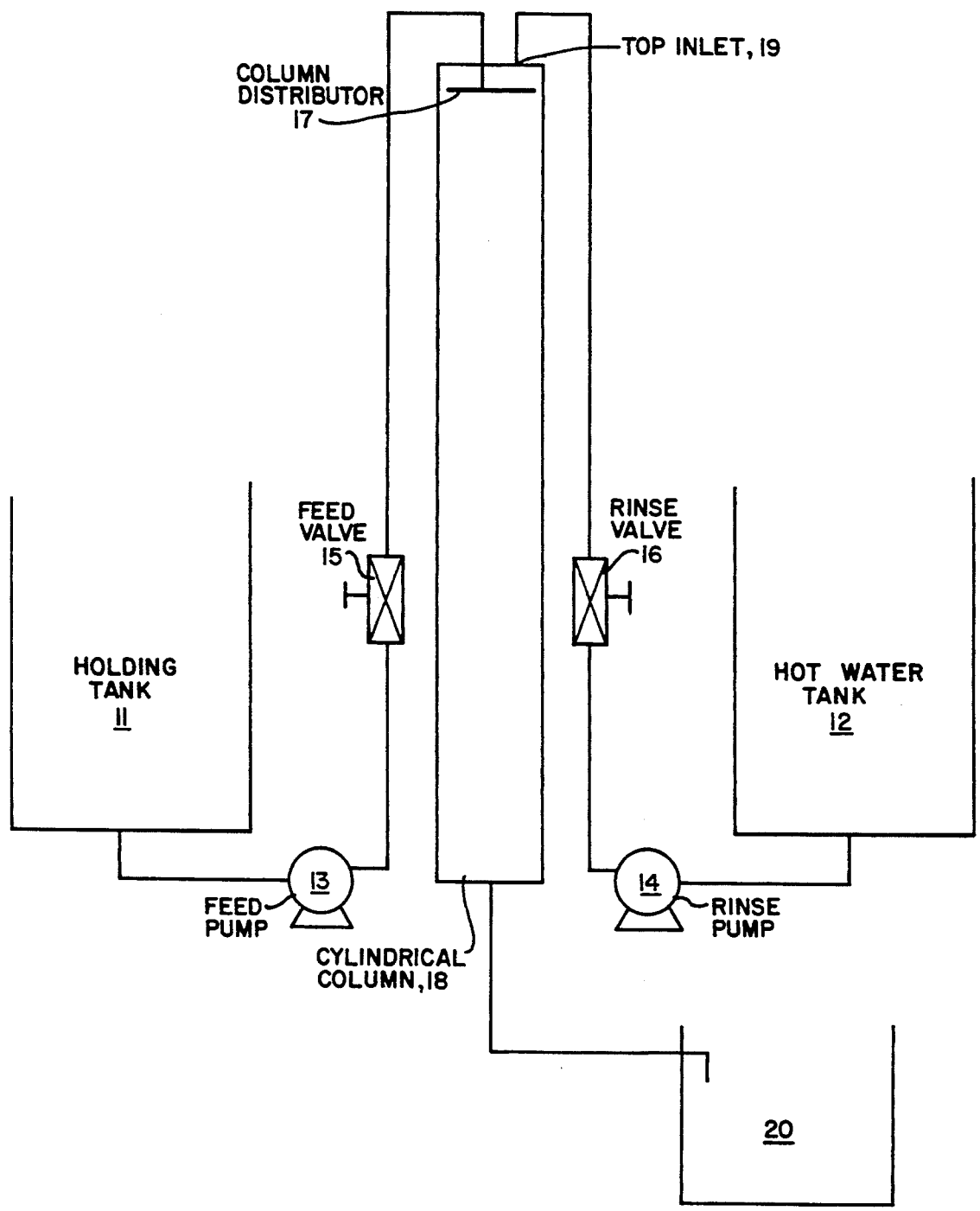
FIG. 8 is a diagram of an apparatus suitable for use in the present invention as shown in examples 7 and 8.

Using an apparatus such as that described in FIG. 8, i.e., a cylindrical column 18 which was 6 inches in diameter and 72 inches long packed with porous cellulose beads to a depth of 70.5 inches, the lower molecular weight sugar and ash components of the pre-treated molasses were separated from the higher molecular weight non-sugar impurities.

Specifically, 9 liters of pretreated molasses at a brix of 45° was pumped from a holding tank 11 by a feed pump 13 through a feed valve 15 to the column distributor 17 at a flow rate of about 300 ml/minute. The molasses was distributed uniformly across the surface of the porous cellulose beads by the column distributor 17 and eluted from the column by pumping water from the hot water tank 12 with the rinse pump 14 through the rinse valve 16 to the top inlet. The eluate was collected in tank 20. The porous cellulose bead column separated the molasses into two fractions by size exclusion. The first fraction to exit the column (as monitored visually) contained the higher molecular weight non-sugar impurities. The second fraction to exit the column was monitored for both conductivity and brix. This fraction contained the lower molecular weight components, the sugars and salts. This fraction was collected and evaporated to about 79.6° brix.

The object of the crystallization process, when using either sugar boiling pans or crystallizers, is to remove as much sucrose as possible from the massecuite and limiting the loss of sucrose to the final molasses. Crystallization is achieved by decreasing the solubility of sucrose in the massecuite. The state of supersaturation of sucrose is accomplished by the evaporation of water in the pan boiling system. In crystallizers, supersaturation is accomplished by decreasing the temperature of the massecuite. The rate at which crystallization occurs is dependent on the degree of supersaturation, the crystal surface area, the temperature of the solution, and the nature and concentration of the impurities. The viscosity of the solution is determined by the same variables. Viscosity is one of the limiting factors in the degree of sucrose crystallization, therefore, it follows that the degree of sucrose crystallization is directly related to the viscosity of the sucrose-containing solution. With this in mind, this example and Example 8 illustrate the ability of the present invention to increase sucrose crystallization from juices, liquors, syrups, and/or molasses as evidenced by a reduction of viscosity of the starting sample.

The viscosity of the molasses starting material ("blackstrap molasses") and that of the lower molecular weight size exclusion product ("evaporated fraction") were compared and the results were as follows:
1) Dynamic viscosity 40° C. Blackstrap molasses 78.8° brix 3200 cp. Evaporated fraction 79.6° brix 1245 cp.
2) Dynamic viscosity 70° C. Blackstrap molasses 78.8° brix 1075 cp. Evaporated sample 79.6° brix 210 cp.

EXAMPLE 8

Employing the process and apparatus described in Example 7, 9 liters of pretreated molasses were loaded onto a porous cellulose bead size exclusion column, except that the size exclusion column was packed to a depth of 68.5 inches, and the components eluted therefrom. The viscosity of the blackstrap molasses starting material and that of the evaporated fraction were compared and the results were as follows:
1) Dynamic viscosity 40° C. Blackstrap molasses 78.8° brix 3200 cp. Evaporated fraction 79.4° brix 1120 cp.
2) Dynamic viscosity 70° C. Blackstrap molasses 78.8° brix 1075 cp. 8 Evaporated sample 79.4° brix 210 cp.

EXAMPLE 9

150 gallons of molasses at 79.5° brix were diluted to 48° brix with water, then acidified to approximately pH 2.1 with 66 Be' sulfuric acid. The resulting solution was heated to 70° C. and allowed to react for four hours. During this time, the sucrose portion of the molasses became inverted to the monosaccharides glucose and fructose, and the level of calcium in the sample was reduced by precipitation as calcium sulphate. After inversion and precipitation, the sample was centrifuged to remove the calcium sulphate and any other suspended solids.

Ammonium hydroxide was then added to the sample to raise the pH to about 3.5.

Figure 9:
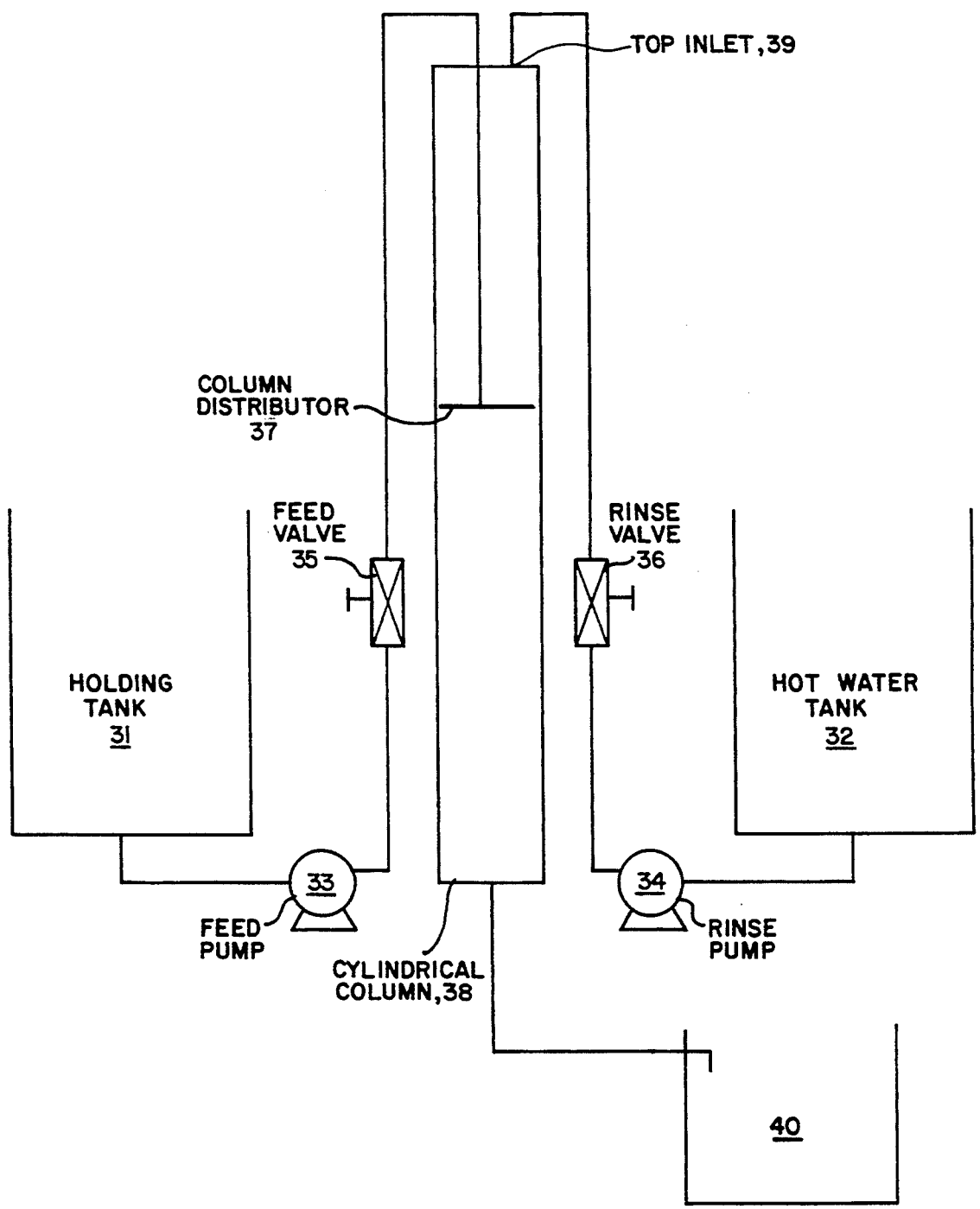
FIG. 9 is a diagram of an apparatus suitable for use in the present invention as shown in example 9.

An apparatus as described in FIG. 9, i.e., a cylindrical column 38 which is 24 inches in diameter and 96 inches long, packed to a depth of 58 inches with porous cellulose bead size exclusion resin, was loaded with the pretreated molasses, which was then eluted therefrom.

More specifically, 55 gallons of the pretreated molasses at a brix of 42.8° was pumped from a holding tank 31 by a feed pump 33 through a feed valve 35 to the column distributor 37, at a flow rate of 2.2 gal/minute. The sample was distributed uniformly across the surface of the porous cellulose beads by the column distributor and the sample was eluted from the column by pumping water from a hot water tank 32 by a rinse pump 34 through a rinse valve 36 to an inlet at the top of the column. The eluate was monitored for turbidity and brix using a spectrophotometer and a refractometer.

Figure 10:
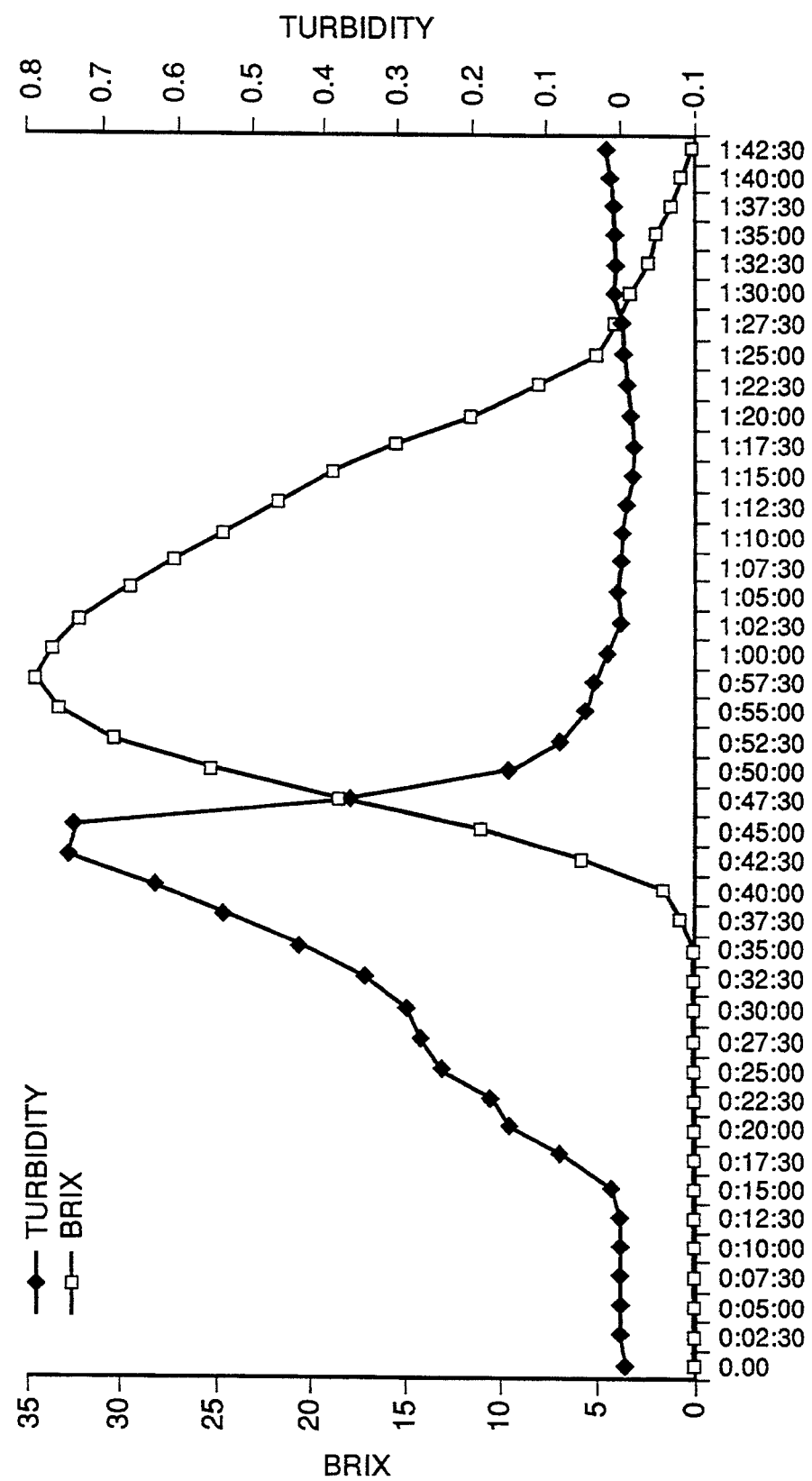
FIGS. 10 and 11 graphically represent the mode of change of concentration distribution of a feed as it exits the separating medium of examples 9 and 10. The abscissa represents the volume of effluent exiting the column and the ordinate on each side representing brix and turbidity, as shown.

As shown in FIG. 10, turbidity and brix values correspond to changes in the concentration of the higher and lower molecular weight components—higher turbidity values represent high concentrations of high molecular components and brix measurements reflect the change in concentration of the low molecular weight sugars and salts.

As evidenced by the turbidity readings, the first fraction to exit the column contained the higher molecular weight non-sugar impurities. In this example and the examples to follow, the first fraction was discarded, however, when run on an industrial scale, one part of this fraction would be discarded as waste, while a second part would be recycled to be used as dilution water in step a) of subsequent processes. The second fraction to exit the column contained the lower molecular weight sugars and salts as evidenced by the brix readings. This fraction was collected in the product tank 40.

EXAMPLE 10

Figure 11:
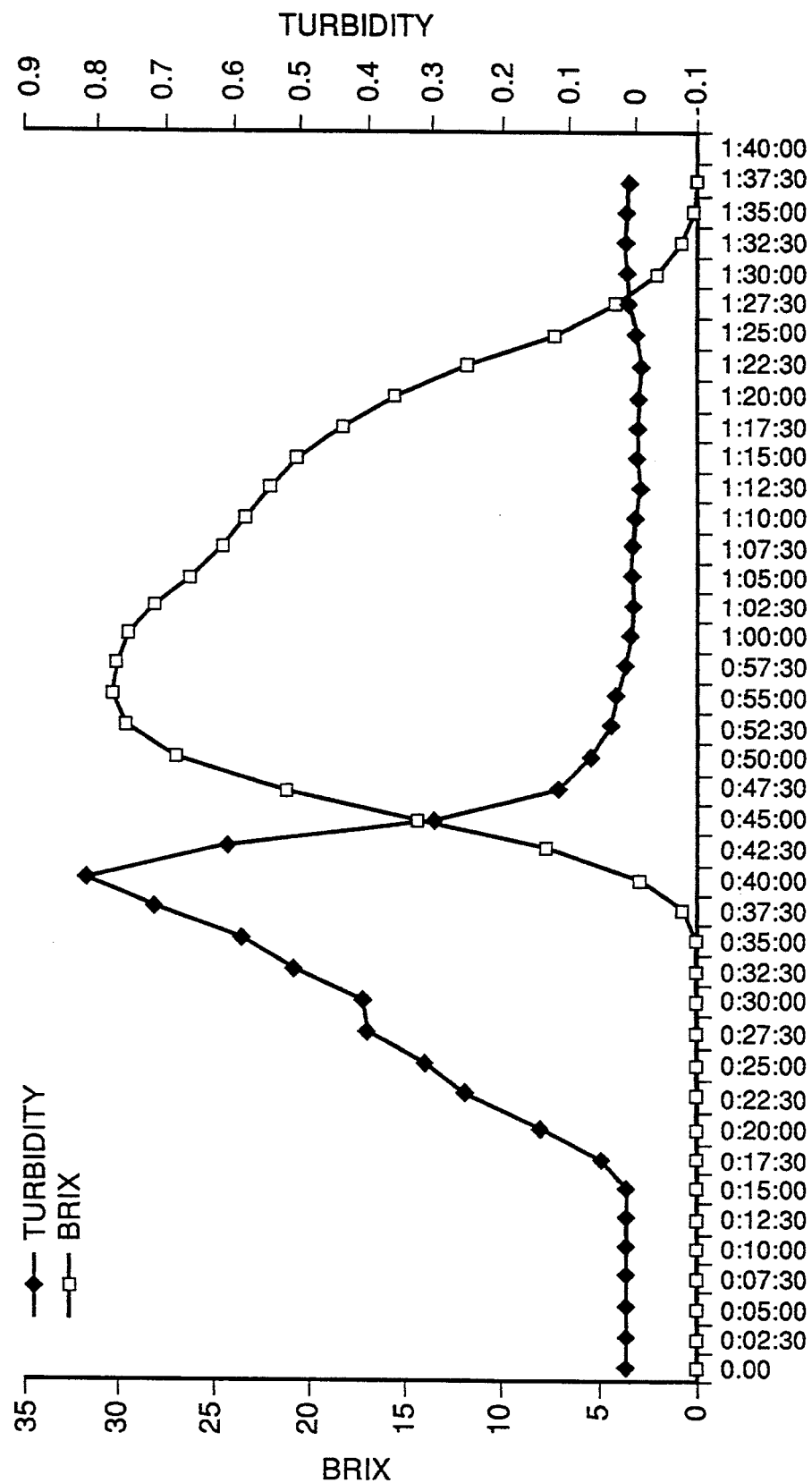

Example 9 was repeated using the method and apparatus described in Example 9, except that 45 gallons of pretreated molasses was charged and eluted through the cellulose bead resin. Results are shown in FIG. 11.

EXAMPLE 11

150 gallons of molasses at 79.5° brix were diluted to 52° brix with water, then acidified to approximately pH 2.1 with 66 Be' sulfuric acid. The resulting solution was heated to 70° C. and allowed to react for four hours. During this time, the sucrose portion of the molasses became inverted to the monosaccharides glucose and fructose, and the level of calcium in the sample was reduced by precipitation as calcium sulphate. After inversion and precipitation, the sample was centrifuged to remove the calcium sulphate and any other suspended solids.

Sodium hydroxide was then added to the sample to raise the pH to about 5.0, and the resulting solution was stirred for 15 minutes. The sample was then filtered to remove any remaining solids.

An apparatus as described in FIG. 9, i.e., a cylindrical column 38, 24 inches in diameter and 96 inches long, packed to a depth of 68.5 inches with porous cellulose bead size exclusion resin, was loaded with the pretreated molasses, which was then eluted therefrom.

More specifically, 52 gallons of the pretreated molasses at a brix of 51.1° was pumped from a holding tank 31 by a feed pump 33 through a feed valve 35 to the column distributor 37, at a flow rate of 2.3 gal/minute. The sample was distributed uniformly across the surface of the porous cellulose beads by the column distributor and the sample was eluted from the column by pumping water from a hot water tank 32 by a rinse pump 34 through a rinse valve 36 to an inlet 39 at the top of the column. The eluate was monitored for conductivity and brix using a conductivity meter and a refractometer and allowed to flow into tank 40. The sample run through the porous cellulose bead column was separated into two fractions by size exclusion. The first fraction to exit the column was monitored visually and contained the higher molecular weight non-sugar impurities. The second fraction was monitored for both conductivity and brix and contained the lower molecular weight sugars and salts. This fraction was collected in product tank 40.

Two additional 52 gallon samples were separated and the lower molecular weight fractions were collected and combined with the lower molecular weight fraction from the original 52 gallon sample.

Figure 12:
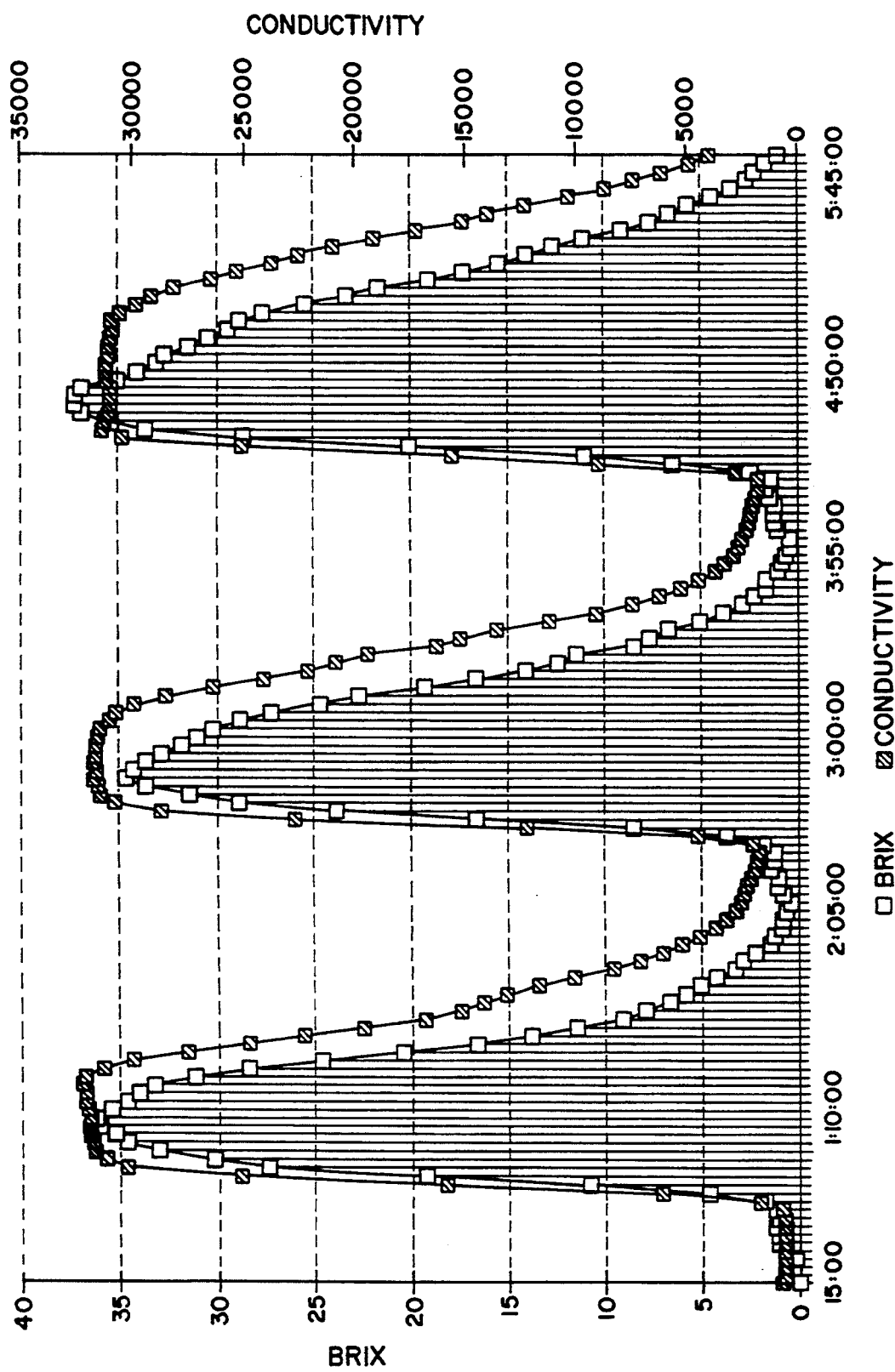
FIG. 12 graphically represents the mode of change of the concentration distribution of the feed as it exits the separating medium as in examples 9 and 10. The abscissa represents the time within which the effluent exits the column with the ordinate representing brix, and representing conductivity, on each side as shown.

As shown in FIG. 12, the brix and conductivity values correspond to the change in concentration of the lower molecular weight sugars and ash; brix measurements and conductivity measurements indicate changes in the concentration of sugars and salts, respectively.

The combined fractions were evaporated to 58° brix. After evaporation, the samples were subjected to weak acid cation exchange softening, ion exclusion, decolorization, cation exchange, anion exchange, and activated carbon filtration. The resulting sample was evaporated and evaluated as a natural sweetener product for use in the food, pharmaceutical, dairy, and bottling industries. The sample had the following compositional analysis:

| | | |
|---|---|---|
| Fructose | 56.00% | w/w of solids |
| Glucose | 43.95% | w/w of solids |
| Other saccharides | 0.00% | w/w of solids |
| Color | 18 | Reference Basis Units as determined in accordance with the National Soft Drink Association |
| Ash (sulfated) | 0.02% | w/w of solids |
| pH | 4.8 | |
| Solids | 77.5% | By refractometer at 20° C. |

Other alternative process embodiments are shown in FIGS. 13 to 21, described in detail as follows.

Figure 13:
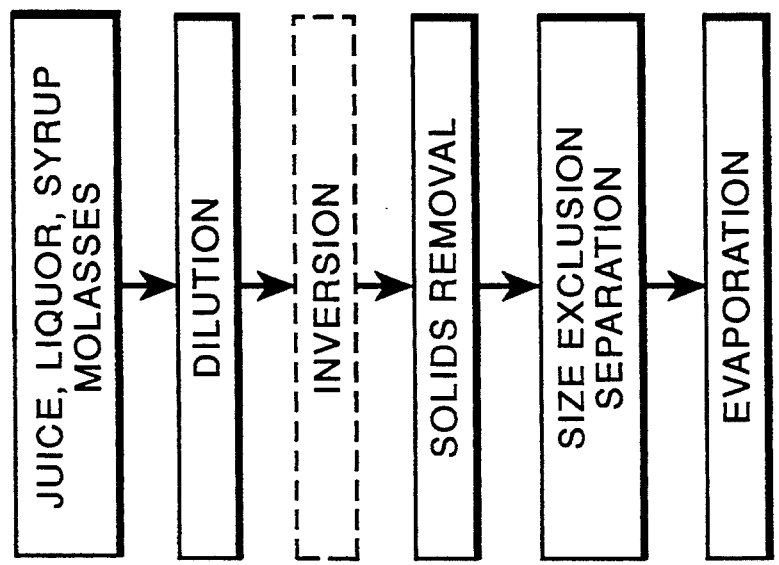

In FIG. 13 the feed of juice, liquor, syrup and/or molasses is diluted sufficiently to permit passage of the feed through a chromatographic separation medium and alternatively, inverting the sucrose in the feed to glucose and fructose. It should be noted that this inversion may be performed at any step of the process. After dilution suspended solids are removed and the feed is passed through a size exclusion separation medium to remove higher molecular weight organic non-sugars, colloidal materials and inorganic-organic complexes. The lower molecular weight sugar containing fraction is then evaporated.

Figure 14:
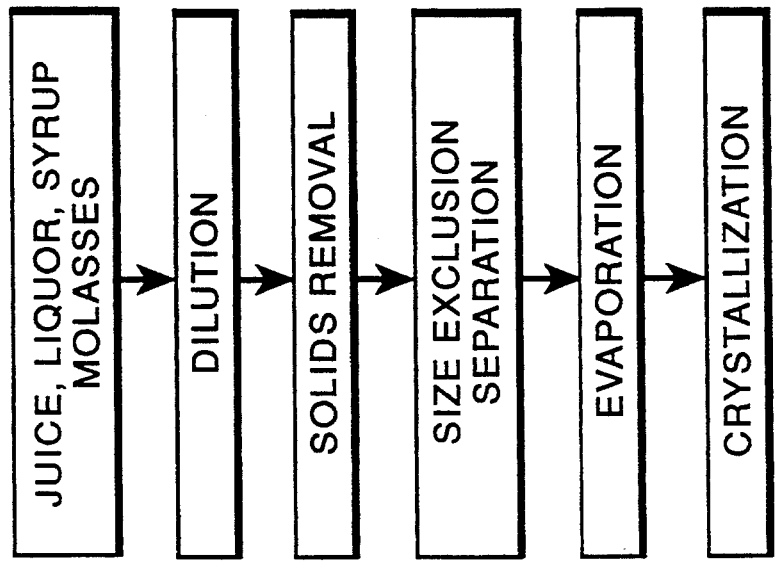

In FIG. 14 the feed of juice, liquor, syrup and/or molasses is diluted sufficiently to permit passage of the feed through a chromatographic separation medium. After dilution suspended solids are removed and the feed is passed through a size exclusion separation medium to remove higher molecular weight organic non-sugars, colloidal materials and inorganic-organic complexes. The lower molecular weight sugar containing fraction is evaporated and the sucrose contained in the fraction is crystallized.

Figure 15:
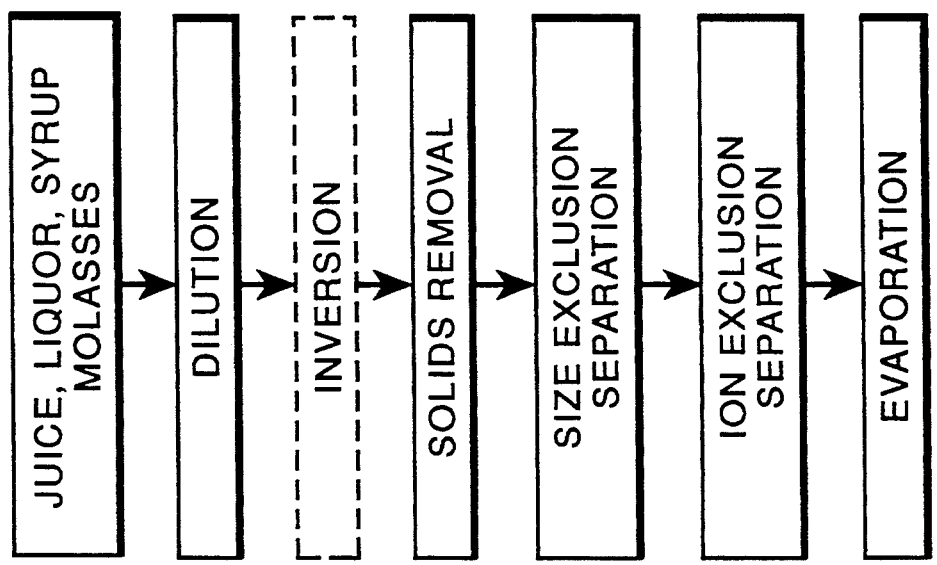

In FIG. 15 the feed of juice, liquor, syrup and/or molasses is diluted sufficiently to permit passage of the feed through a chromatographic separation medium and alternatively, inverting the sucrose in the feed to glucose and fructose. It should be noted that this inversion may be performed at any step of the process. After dilution suspended solids are removed and the feed is passed through a size exclusion separation medium to remove higher molecular weight organic non-sugars, colloidal materials and inorganic-organic complexes. The lower molecular weight sugar containing fraction is then passed through an ion exclusion separation medium to remove non-sugar impurities. The lower molecular weight sugar containing fraction is then evaporated.

Figure 16:
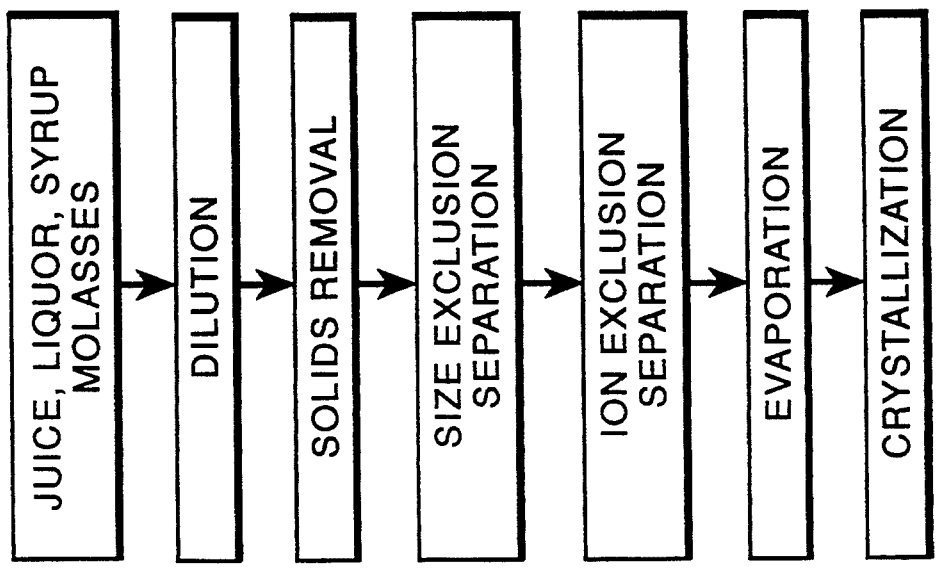

In FIG. 16 the feed of juice, liquor, syrup and/or molasses is diluted sufficiently to permit passage of the feed through a chromatographic separation medium. After dilution suspended solids are removed and the feed is passed through a size exclusion separation medium to remove higher molecular weight organic non-sugars, colloidal materials and inorganic-organic complexes. The lower molecular weight sugar containing fraction is then passed through an ion exclusion separation medium to remove non-sugar impurities. The lower molecular weight sugar containing fraction is then evaporated and the sucrose contained in the fraction is crystallized.

Figure 17:
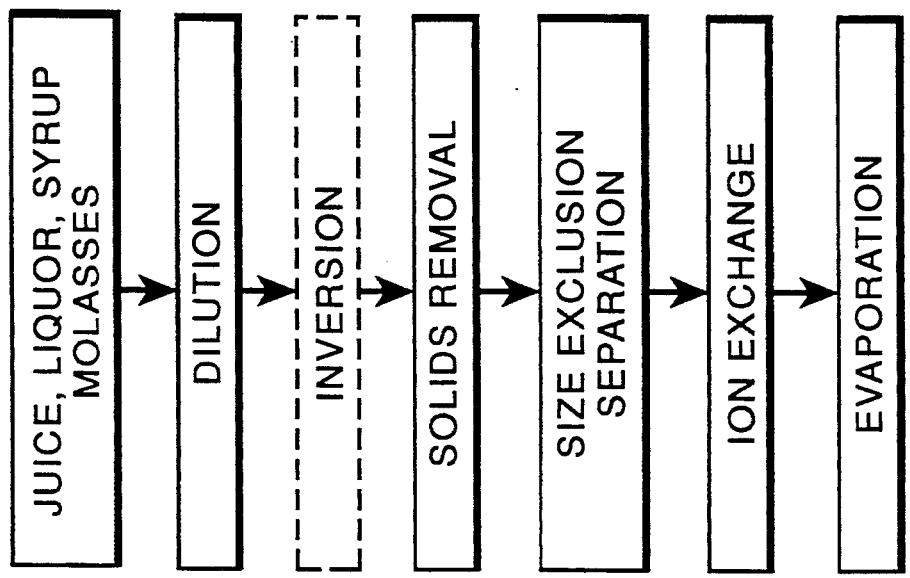

In FIG. 17 feed of juice, liquor, syrup and/or molasses is diluted sufficiently to permit passage of the feed through a chromatographic separation medium and alternatively, inverting the sucrose in the feed to glucose and fructose. It should be noted that said inversion may be performed at any step of the process. After dilution suspended solids are removed and the feed is passed through a size exclusion separation medium to remove higher molecular weight organic non-sugars, colloidal materials and inorganic-organic complexes. The lower molecular weight sugar containing fraction is then passed through an ion exclusion separation medium to remove non-sugar impurities. The lower molecular weight sugar containing fraction is then evaporated.

Figure 18:
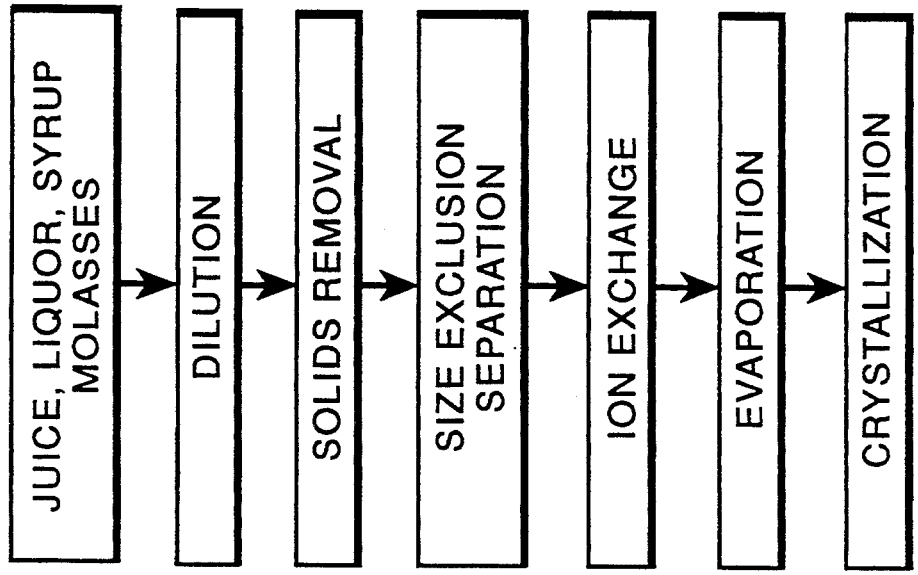

In FIG. 18 feed of juice, liquor, syrup and/or molasses is diluted sufficiently to permit passage of the feed through a chromatographic separation medium and alternatively, inverting the sucrose in the feed to glucose and fructose. After dilution suspended solids are removed and the feed is passed through a size exclusion separation medium to remove higher molecular weight organic non-sugars, colloidal materials and inorganic-organic complexes. The lower molecular weight sugar containing fraction is then passed through an ion exclusion separation medium to remove non-sugar impurities. The lower molecular weight sugar containing fraction is then evaporated and the sucrose contained in the fraction is crystallized.

In FIG. 19 feed of juice, liquor, syrup and/or molasses is diluted sufficiently to permit passage of the feed through a chromatographic separation medium and alternatively, inverting the sucrose in the feed to glucose and fructose. It should be noted that said inversion may be performed at any step of the process. After dilution suspended solids are removed and the feed is passed through a size exclusion separation medium to remove higher molecular weight organic non-sugars, colloidal materials and inorganic-organic complexes. The lower molecular weight sugar containing fraction is then passed through an ion exclusion separation medium to remove non-sugar impurities, then through an ion exchange separation medium for further purification. The lower molecular weight sugar containing fraction is then evaporated.

In FIG. 20 feed of juice, liquor, syrup and/or molasses is diluted sufficiently to permit passage of the feed through a chromatographic separation medium. After dilution suspended solids are removed and the feed is passed through a size exclusion separation medium to remove higher molecular weight organic non-sugars, colloidal materials and inorganic-organic complexes. The lower molecular weight sugar containing fraction is then passed through an ion exclusion separation medium to remove non-sugar impurities, then through an ion exchange separation medium for further purification. The lower molecular weight sugar containing fraction is then evaporated and the sucrose contained in the fraction is crystallized.

Figure 21:
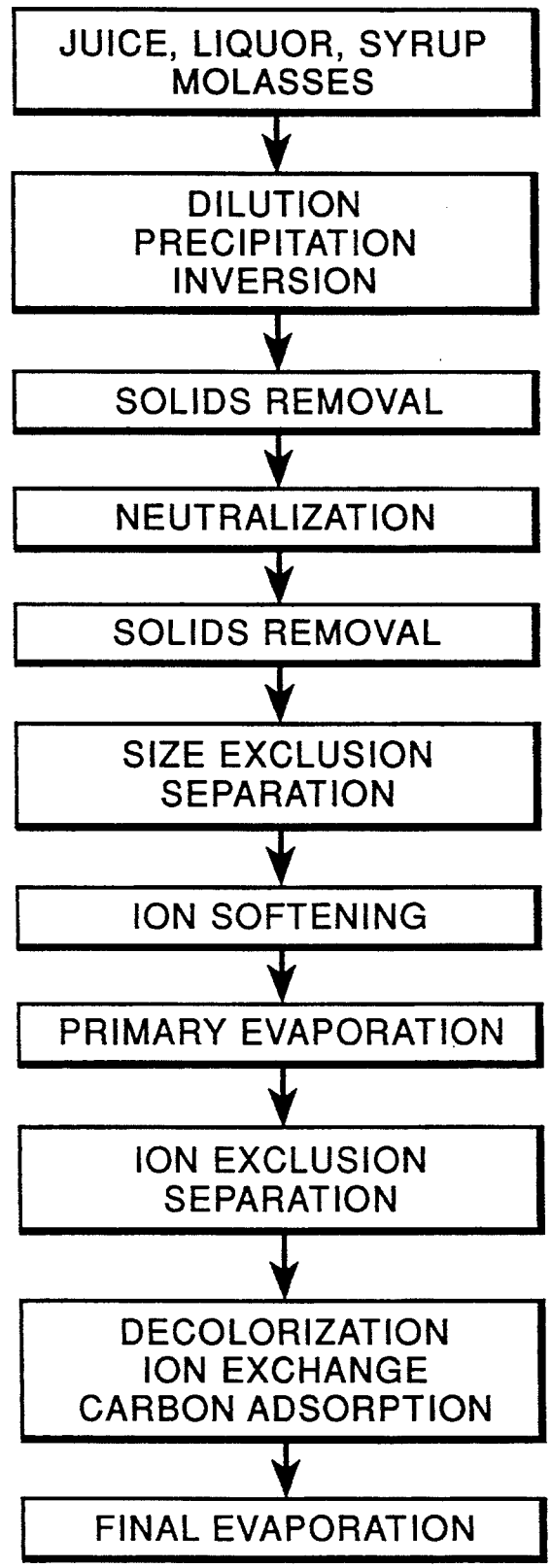
FIG. 21 is a schematic block diagram showing the process of this invention in more detail.

In FIG. 21 feed of juice, liquor, syrup and/or molasses is diluted sufficiently to permit passage of the feed through a chromatographic separation medium and alternatively, inverting the sucrose in the feed to glucose and fructose. It should be noted that said inversion may be performed at any step of the process. Metal cations are precipitated. After dilution, inversion and precipitation, suspended solids are removed and the feed is neutralized by pH adjustment. Any solids formed are removed and the feed is then passed through a size exclusion separation medium to remove higher molecular weight organic non-sugars, colloidal materials and inorganic-organic complexes. The lower molecular weight sugar containing fraction is collected and then passed through an ion exchange separation medium for decolorization. The feed is next passed through an ion exchange separation medium for ash removal. Carbon and/or bone char are used as a final polishing filter. The lower molecular weight sugar containing fraction is then evaporated.

While the invention has been described in connection with what is presently considered to be the most practical and preferred embodiments, the invention is not limited to the disclosed embodiments but, on the contrary, is intended to cover various modifications and equivalents included within the spirit and scope of the following claims.

We claim:

1. A process for separating inorganic-organic complexes, colloidal materials and organic non-sugars from a feed selected from the group consisting of juices, liquors, syrups, molasses or mixtures thereof into two or more fractions, at least a first fraction comprising the high molecular weight non-sugar components, and at least a second fraction comprising the low molecular weight sugar, said sugar containing sucrose and soluble salt components, by means of a size exclusion chromatographic separation resin medium selected from the group consisting of porous cellulose, crosslinked agarose, crosslinked dextran, styrene-divinylbenzene polyacrylamide, methacrylic, and controlled pore glass, said process comprising the steps of:

a) diluting the feed of juice, liquor, syrup, molasses or mixtures thereof with water sufficient to permit passage of the sample through said chromatographic separation medium, b) removing insoluble matter from the feed, and c) passing the diluted feed through the chromatographic separation medium and eluting the feed components from the medium with water, thereby achieving separation of the high and low molecular weight components of the feed into two or more fractions, at least a first fraction comprising the high molecular weight non-sugar components comprising organic non-sugars, nitrogenous compounds, non-nitrogenous acids, waxes, sterols, phosphatides, gums, starches, pentosans, vitamins and inorganic-organic complexes, and at least a second fraction comprising the low molecular weight sugar comprising sucrose, glucose and fructose and soluble salt components.

2. The process of claim 1 wherein said lower molecular weight fraction is then evaporated to about 45°–80° brix.

3. A process of claim 2 wherein the sucrose contained in the low molecular weight fraction is crystallized.

4. The process of claim 1 wherein the sugars in the low molecular weight fraction are separated from the soluble salt components by ion exclusion chromatography.

5. The process of claim 4 wherein the said low molecular weight fraction is then evaporated to about 45° to 80° brix.

6. The process of claim 5 wherein the sucrose contained in the low molecular weight fraction is crystallized.

7. The process of claim 1 wherein the sugars in the low molecular weight fraction are further purified by ion exchange chromatography.

8. The process of claim 7 wherein the said low molecular weight fraction is then evaporated to about 45° to 80° brix.

9. The process of claim 8 wherein the sucrose contained in the low molecular weight fraction is crystallized.

10. The process of claim 1 wherein the sucrose contained in the low molecular weight fraction is inverted to glucose and fructose.

11. The process of claim 10 wherein the sugars in the low molecular weight fraction are further purified by ion exchange chromatography.

12. The process of claim 11 wherein the said low molecular weight fraction is then evaporated to about 45° to 80° brix.

13. The process of claim 10 wherein the sugars in the low molecular weight fraction are separated from the soluble salt components by ion exclusion chromatography.

14. The process of claim 13 wherein the said sugars are then evaporated to about 45° to 80° brix.

15. The process of claim 13 wherein the sugars in the low molecular weight fraction are further purified by ion exchange chromatography.

16. The process of claim 15 wherein the said low molecular weight fraction is then evaporated to about 45° to 80° brix.

17. A process for separating inorganic-organic complexes, colloid materials and organic non-sugars from a feed selected from the group consisting of process juices, liquors, syrups, molasses or mixtures thereof said juices, liquors, syrups and molasses containing sucrose into two or more fractions, at least a first fraction comprising the high molecular weight non-sugar components, and at least a second fraction comprising the low molecular weight sugar and soluble salt components, by means of a size exclusion chromatographic separation resin medium selected from the group consisting of porous cellulose, crosslinked agarose, crosslinked dextran, styrene-divinylbenzene, polyacrylamide, methacrylic, and controlled pore glass, said process comprising the steps of:

a) diluting the feed of process juice, liquor, syrup, molasses or mixtures thereof with water sufficient to permit passage of the sample through the separation medium, b) reducing the metal cations in the feed by precipitation, c) inverting the sucrose in the feed to fructose and dextrose, d) removing insoluble matter from the feed, e) adjusting the pH of the feed to a range of between about 2.5 and 7.0, f) removing insoluble matter from the pH adjusted feed, and g) passing the feed through the chromatographic separation medium using water as an eluant, thereby achieving separation of the high and low molecular weight components of the feed into two or more fractions, at least a first fraction comprising the high molecular weight non-sugar components comprising organic non-sugars, nitrogenous compounds, non-nitrogenous acids, waxes, sterols, phosphatides, gums, starches, pentosans, vitamins and inorganic-organic complexes, and at least a second fraction comprising the low molecular weight sugar comprising sucrose, glucose and fructose and soluble salt components, h) reducing the divalent cation concentration in the fractions to a range between about 0 and 5000 parts based on solids per million;

i) evaporating the low molecular weight components-containing fractions to a range of about 35 to 80 brix, and j) reducing the non-sugar concentration to a range of about 0 to 20 percent based on solids, so that said low molecular weight component containing fractions can be further processed into an edible sweetener product.

18. The process of claim 17 wherein said cations in step b) are substantially divalent cations.

19. The process of claim 18 wherein the said cations are substantially calcium.

20. The process of claim 17 wherein the said insoluble matter is removed by centrifugation in the steps d, f, or both.

21. The process of claim 17 wherein the said insoluble matter is removed by filtration in steps d, f, or both.

22. The process of claim 17 wherein the said insoluble matter is removed by both centrifugation and filtration in steps d, f, or both.

23. The process of claim 17 wherein the said pH in step e) is between about 3 and 6.

24. The process of claim 17 wherein the non-sugar concentration in step j) is reduced by ion exchange chromatography.

25. The process of claim 24 wherein the said low molecular weight fraction is then evaporated to about 45° to 80° brix.

26. The process of claim 17 wherein the non-sugar concentration is step j) is reduced by ion exclusion chromatography.

27. The process of claim 26 wherein the said sugars are then evaporated to about 45° to 80° brix.

* * * * *